3,455,894
PROCESS OF PREPARING HIGH POTENCY IODINATED PROTEIN WHICH COMPRISES REACTING SAID PROTEIN WITH Ba(OH)₂ AT A TEMPERATURE OF AT LEAST 110° C.
Richard D. Hoover, Lee's Summit, Mo., and George O. Kohler, El Cerrito, Calif., assignors to Agri-Tech, Inc., Kansas City, Mo., a corporation of Missouri
No Drawing. Filed Apr. 7, 1966, Ser. No. 540,828
Int. Cl. C07g 7/00, 15/00; A61k 17/10
U.S. Cl. 260—119
16 Claims

ABSTRACT OF THE DISCLOSURE

A process for augmenting the biological activity of synthetic thyroprotein is provided wherein thyroactive iodinated protein is contacted with barium hydroxide at a temperature of from about 110° C. to 175° C.

---

The present invention relates to improvements in a synthetic thyroprotein composition and more particularly to a very efficient method for producing a high potency composition by liberating thyroxine from iodinated tyrosine containing protein involving a treatment of the iodinated protein with barium hydroxide under special conditions.

It has been well known heretofore that many proteins can be reacted with iodine under suitable conditions to form a product which has a biological activity resembling that of dried thyroid tissue when administered to livestock or poultry or when used in human therapy. In the case of thyroid gland material, the active principle, the amino cida thyroxine, is already essentially completely available, while in the case of the iodinated proteins, the tyrosine is believed to be partly or completely converted to thyroxine still bound as a component part of the starting protein. Commercial thyroactive protein contains about 1% l. thyroxine, but by the thiouracilized chick bioassay, only one quarter of this thyroxine is available.

While some thyroxine can be isolated by either acid or barium hydroxide treatment of iodinated protein, it does not follow that thyroxine, per se, exists in the protein in simple peptide form. Rather, recent work by ourselves and others strongly indicates that the thyroxine forming during reaction with either acid or base is liberated from a complex precursor bound in the protein by peptide linkages.

Johnston and Tewksbury, Proc. Natl. Acad. Sci., 28:73 (1942) have postulated a structure for this precursor and the liberation of thyroxine therefrom may be represented as follows:

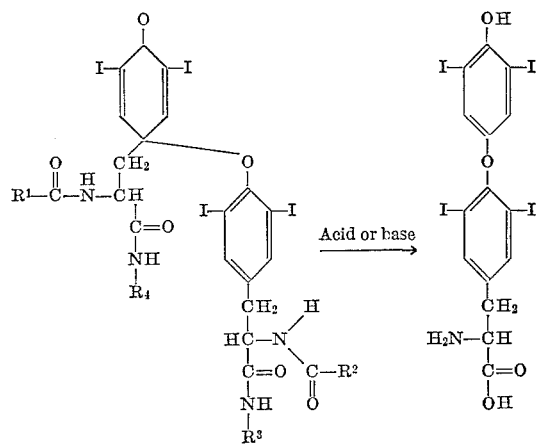

precursor → thyroxine + by-products where $R^1$, $R^2$, $R^3$ and $R^4$ represent the linking of the precursor to the parent protein molecule.

The evidence supporting this reaction mechanism is (1) the decreased susceptibility of iodinated protein treated with oxygen to the action of tryptic enzymes as compared to the original protein as would be expected if an unusual type of crosslinking had taken place: (2) the biological activity of iodinated protein is proportionately much less than would be expected on the basis of the amount of thyroxine obtainable from acid or alkali treated products. This effect might be partly due to decreased digestibility of the iodinated proteins as compared with acid or base treated material, but is also in accord with the idea that the precursor, per se, is not highly active and that conversion of precursor to thyroxine does not occur rapidly enough within the digestive tract to permit efficient thyroxine absorption; (3) acids or alkalis have a different effect on the biological activity of artificially iodinated proteins than on the biological activity of desiccated thyroid tissue where the thyroxine is present either as such, or as a different type of precursor; in either case bound in peptide form and (4) lastly, the amount of thyroxine obtainable on complete barium hydroxide or acid treatment is a function of reaction conditions. This point is the strongest evidence for validity of the above mechanism and also is the basis of the present invention and of the invention in our copending application Ser. No. 584,119 filed Oct. 4, 1966.

We have discovered that the precursor of thyroxine which occurs in artificially iodinated protein can be converted into thyroxine by barium hydroxide treatment but that the conditions for obtaining optimum results had to be determined empirically and could not be predicted on the basis that simple reaction to free amino acids was all that was necessary.

It had been believed that the formation of thyroxine from the precursor followed an entirely different course. The previously accepted mechanism for barium hydroxide hydrolysis as described by Reinecke et al., J. Biol. Chem., 161:599 (1945) was the simple liberation of thyroxine from peptide bonds in the iodinated protein. In the work described by these authors, it had been shown that treating with barium hydroxide at 100° C. produced increasing amounts of free thyroxine as time progressed up to about 6 to 12 hours of treatment. Further treatment at 100° C. produced no increase or decrease in thyroxine content. Thus, it was believed established that at 18 hours treatment time, all of the amide groups of the protein were split and since no losses occurred in further treatment, it was apparent that thyroxine was stable to barium hydroxide treatment. This point was verified by similarly treating pure crystalline thyroxine.

It was then most surprising to discover that treating iodinated protein with barium hydroxide at elevated temperatures and pressures yielded more thyroxine than that produced by complete barium hydroxide hydrolysis at atmospheric pressure and at 100° C. This clearly showed that in addition to hydrolysis, the hot barium hydroxide treatment was converting a thyroxine precursor into thyroxine. We have thus provided a new means of providing thyroxine precursor in a more assimilable form by a barium hydroxide treatment of thyroactive artificial iodinated protein under carefully specified conditions of pressure and temperature to thereby provide a product of increased protency and commercial value.

The high potency preparations are provided according to the invention by subjecting the iodinated protein to barium hydroxide at an elevated temperature of from about 110° C. to about 175° C. with sufficient pressure (from about 20–130 p.s.i.a.) to assure reaction at these temperatures. The material is then recovered as a water solution by raising the pH to about 9–10 and then adding an anion to the mixture that precipitates the barium.

Alternatively, the supernatant liquid may be decanted into a larger body of water. The residue is then treated with an acid such as HCl or acid and a solvent for the residue such as butanol which is then stirred and gently heated until the residue of barium salts dissolves. This solution is then combined with the decanted supernatant liquid, the pH adjusted to 3–4 with dilute hydrochloric acid and the precipitate separated from the supernatant. This precipitate is suspended in a small amount of water and the pH adjusted to 10–12 with concentrated sodium hydroxide and an excess of sodium sulphate added to precipitate the barium as barium sulphate. The mixture may be utilized as is or processed further by drying, per se, or precipitation by acid and then drying.

The amount of barium hydroxide to be utilized is in no way critical and in fact encompasses the amounts previously utilized in the art, i.e., from about 2 to 4 times the amount of thyroprotein on a weight basis. The time needed for the reaction varies inversely with temperature with only about 5 to 10 minutes needed at the higher temperatures and 4 to 6 hours at the lower temperatures. The intermediate temperatures of 125° C. to 155° C. are preferred, since only moderate pressures of 34–79 p.s.i.a. are required and the reaction is sufficiently complete within 15 minutes to 4 hours to provide a product having very good biological properties.

The source of iodinated protein is preferably iodinated casein such as "Protamone," because of the ready availability of this product. However, other tyrosine containing iodinated proteins such as iodinated soybean globulin and iodinated blood serum protein can also be treated according to the invention. A suitable source of barium hydroxide is $Ba(OH)_2 \cdot 8H_2O$, though, of course, other barium hydroxide compounds with different degrees of hydration can be utilized in equivalent amounts.

The following example is illustrative of a specific procedure that can be followed in the practice of the present invention:

EXAMPLE

A suitable jacketed pressure reaction vessel, equipped with an agitator is charged with 128 lbs. of water, 64 lbs. of $Ba(OH)_2 \cdot 8H_2O$ and 20 lbs. of "Protamone." Steam is turned into the jacket and the agitator is started. The vessel is closed and the air allowed to escape by cracking a valve. When the temperature of the mixture reaches 212° F., the valve is closed and the application of heat is continued until the temperature of the reaction mixture reaches 130° C. (25 p.s.i.). The agitator is then stopped and the vessel held at this temperature and pressure for 4 hours. The vessel is then cooled to room temperature. With stirring the solution is adjusted to pH 9–10. 160 lbs. of 20% $Na_2SO_4$ are then added to precipitate the barium as $BaSO_4$ which is separated by filtration or centrifugation. The thyroxine may be recovered by precipitation at pH of 4 to 8 followed by centrifugation or filtration.

The above procedure was repeated except that the temperature or time or pressure were varied and the resulting product was analyzed both chemically by spectrophotometric analysis and by the thiouracilized chick bioassay method for actual and apparent percent thyroxine. The results and conditions of these experiments appear in the following table:

| Example | Time, hrs. | Temp. (° C.) | Reagent | Percent thyroxine chem. assay | Percent thyroxine chick assay |
|---|---|---|---|---|---|
| Prior art | 18 | 100 | Ba(OH)₂ | 1.070 | 0.855 |
| 1 | 4 | 130 | Ba(OH)₂ | 1.196 | 1.122 |
| 2 | ¼ | 152 | Ba(OH)₂ | 1.050 | 1.090 |
| 3 | ½ | 152 | Ba(OH)₂ | 1.181 | 1.180 |
| 4 | ¼ | 152 | NaOH | 0.687 | 0.332 |

It is thus apparent that the present process provides results superior to the prior art based on bioassay in considerably less time and furthermore, the method is specific to $Ba(OH)_2$, since NaOH under identical conditions provides considerably less thyroxine and biological activity.

The assay procedure is valuable in being a relative measure between prior art preparations and those of the present invention. The particular bioassay procedure utilized to determine the potencies of the final products of the present invention involves feeding day-old female chicks housed in a modified Oakes battery in a 25° C. air-conditioned room on a basal ration containing 0.1% methyl thiouracil. The primary requirement of the ration is that it be a well balanced ration which permits high viability. After one week on this ration, all groups receive a ration containing 0.00001% dl. thyroxine and appropriate levels of a 4 mg. per ml. solution of treated or untreated iodinated protein.

At the age of 22 days each chick is weighed, sacrificed and the thyroid glands are removed. After elimination of fat and connective tissue, the glands are weighed on a Roller-Smith Precision Balance (dial range 50 mg.) to the nearest 0.01 mg. During processing the glands are kept moist with physiological saline solution. Prior to being weighed, the thyroids are rolled on filter paper to remove excess moisture. Each chick is dissected to verify sex and all data from cockerels are discarded.

The product of the invention may be dried in a forced draft oven at 80° C. for several hours to yield a material suitable for administration to animals, poultry or humans. Instead of drying the moist precipitate, the solution or the moist precipitate can be mixed with a feed stuff preferably of an absorbent character such as bran, ground corn cobs or grain, which mixture can then be dried down if desired, preparatory to being fed to the livestock or poultry.

It should be understood that the foregoing disclosure relates only to preferred embodiments of the invention and that numerous modifications or alterations may be made therein without departing from the scope of the present invention, as set forth in the appended claims.

What we claim is:

1. A process for augmenting the biological activity of synthetic thyroprotein comprising contacting a thyroactive iodinated protein with barium hydroxide at a temperature of from about 110° C. to 175° C.

2. A process according to claim 1 in which said temperature is maintained for five minutes to six hours.

3. A process according to claim 1 in which the temperature is from about 125° C. to about 155° C.

4. A process according to claim 3 in which said temperature is maintained for fifteen minutes to four hours.

5. A process according to claim 1 in which the ratio by weight of barium hydroxide to thyroactive iodinated protein is from 2/1 to 4/1.

6. A process according to claim 5 in which said ratio is about 3/1.

7. A process according to claim 1 in which the thyroactive iodinated protein is contacted with barium hydroxide in aqueous media.

8. A process according to claim 1 in which the pressure is from about 20 p.s.i.a. to about 130 p.s.i.a.

9. A process according to claim 1 in which at conclusion of the high temperature treatment, thyroactive material is recovered by raising the pH of the mixture to 9–10 and then adding an anion to the mixture that precipitates barium.

10. A process according to claim 9 in which the precipitated barium salt is separated and the thyroactive material precipitated by adjusting the pH of the remaining liquid to 4 to 8.

11. A process according to claim 1 in which thyroactive material is recovered by decanting the supernatant liquid, dissolving the residue, combining the dissolved portion with the decanted supernatant liquid, and forming a precipitate by adjusting the pH to 3–4, separating and suspending the precipitate in water and raising the pH to 10–12 and then adding an anion to precipitate the barium.

12. A process according to claim 1 wherein $Ba(OH)_2 \cdot 8H_2O$ is present in a ratio of about 3/1 by weight to the thyroactive iodinated protein and the mixture is heated to 152° C.

13. A process according to claim 12, wherein the mixture is heated to 130° C.

14. A process according to claim 1 in which thyroactive iodinated casein is contacted with barium hydroxide.

15. A process according to claim 1 of producing a high potency synthetic thyroactive material comprising forming an aqueous mixture of $Ba(OH)_2 \cdot 8H_2O$ and thyroactive iodinated casein at a weight ratio of about 3/1, heating and agitating this mixture under confinement until a temperature of about 125° C. to 155° C. is attained, holding the mixture at said temperature for about 15 minutes to about 4 hours, cooling the mixture, raising the pH of the mixture to about 9–10 with concentrated sodium hydroxide, adding sodium sulphate to the mixture and separating the barium sulphate which precipitates.

16. A process according to claim 15 wherein the mixture is raised to a temperature of 130° C. and held at this temperature for about 4 hours.

References Cited

UNITED STATES PATENTS

| | | | |
|---|---|---|---|
| 2,130,985 | 9/1938 | Lautenschlager et al. | 260—518 |
| 2,591,107 | 4/1952 | Turner et al. | 99—2 |

OTHER REFERENCES

Vitamins and Hormones, vol. IV, 1946, Reineke, pp. 208–218 and 232–235.

Journal of Biological Chemistry, vol. 161, 1945, pp. 599–611, Reineke et al.

Advances in Protein Chemistry, Roche et al., pp. 253–4 and 272–281, vol. VI, 1951.

WILLIAM H. SHORT, Primary Examiner

HOWARD SCHAIN, Assistant Examiner

U.S. Cl. X.R.

99—18, 20; 260—112, 123.5; 424—177